US00RE35145E

United States Patent [19]

Stark et al.

[11] E Patent Number: Re. 35,145

[45] Reissued Date of Patent: Jan. 9, 1996

[54] SUBSTITUTED PHTHALOCYANINE

[75] Inventors: William Stark, Glasgow, Scotland; Nigel Hughes, Oldham; Donald M. Gunn, Stockport, both of England

[73] Assignee: Zeneca Limited, London, England

[21] Appl. No.: 140,547

[22] Filed: Oct. 25, 1993

Related U.S. Patent Documents

Reissue of:

[64] Patent No.: 4,824,948
Issued: Apr. 25, 1989
Appl. No.: 162,513
Filed: Mar. 1, 1988

[30] Foreign Application Priority Data

Mar. 10, 1987 [GB] United Kingdom ..... 8705575

[51] Int. Cl.[6] ..... C07D 487/22; C09B 47/04; C09B 47/30

[52] U.S. Cl. ..... 540/125; 540/123; 540/124; 540/127; 540/130; 540/132

[58] Field of Search ..... 540/123, 124, 540/125, 127, 130, 132

[56] References Cited

U.S. PATENT DOCUMENTS

| | | | |
|---|---|---|---|
| 4,606,859 | 8/1986 | Duggan et al. | 540/122 |
| 5,137,798 | 8/1992 | Duggan et al. | 430/270 |

FOREIGN PATENT DOCUMENTS

| | | |
|---|---|---|
| 0186404 | 7/1986 | European Pat. Off. . |
| 2252386 | 6/1975 | France . |
| 2455675 | 5/1975 | Germany . |
| 492177 | 9/1938 | United Kingdom . |
| 588231 | 5/1947 | United Kingdom . |
| 629488 | 9/1949 | United Kingdom . |

*Primary Examiner*—Richard L. Raymond
*Attorney, Agent, or Firm*—Cushman Darby & Cushman

[57] ABSTRACT

A phthalocyanine compound of the formula:

$$(R—X—)_m Pc(—Y—R^1—Z—)_n(—SO_3M)_p \qquad I$$

wherein

Pc is a phthalocyanine nucleus (Pc);

each

R independently is a monovalent aromatic radical linked to a peripheral carbon atom of the Pc nucleus through X;

X selected from S, Se and Te;

m is 4 to 16;

each $R^1$ independently is a divalent aromatic radical linked to two adjacent peripheral carbon atoms of the Pc nucleus through Y and Z;

Y is selected from S, NT, Se and Te;

Z is selected from S, Se, Te, NT and O;

T is selected from H, alkyl and aryl;

n is 0 to 7;

M is H, a metal or optionally-substituted ammonium; and

P is from 1 to 16.

The compounds have a significant absorption band in the near infra red and depending on the number of sulphonic acids groups and the nature of the counter ion are soluble in aqueous and polar organic media. The compounds are useful in many applications where absorption of infra-red radiation is desirable, such as in OCR readable inks, rapid-drying inks, security printing and reprographic toners.

6 Claims, No Drawings

SUBSTITUTED PHTHALOCYANINE

Matter enclosed in heavy brackets [ ] appears in the original patent but forms no part of this reissue specification; matter printed in italics indicates the additions made by reissue.

This specification describes an invention relating to certain substituted-thio-phthalocyanine sulphonates which absorb in the near infra-red region of the electromagnetic spectrum, e.g. at 700–1500 nanometers (nm) and especially at 750–1100 nm.

According to the present invention there is provided a phthalocyanine compound of the formula:

$$(R—X—)_m Pc(—Y—R^1—Z—)_n(—SO_3M)_p \quad (I)$$

wherein

Pc is a phthalocyanine nucleus (Pc);

each

R independently is a monovalent aromatic radical linked to a peripheral carbon atom of the Pc nucleus through X;

X selected from S, Se and Te;

m is 4 to 16;

each $R^1$ independently is a divalent aromatic radical linked to two adjacent peripheral carbon atoms of the Pc nucleus through Y and Z;

Y is selected from S, NT, Se and Te;

Z is selected from S, Se, Te, NT and O;

T is selected from H, alkyl and aryl;

n is 0 to 7;

M is H, a metal or optionally-substituted ammonium; and p is from 1 to 16.

The core of the phthalocyanine (Pc) nucleus may be metal-free or contain any of the metals or oxymetals which are capable of being complexed within the core. Examples of suitable metals and oxymetals are magnesium, palladium, gallanyl, vanadyl, germanium, indium and more especially copper, particularly copper(II), nickel, cobalt, iron, zinc, lead and cadmium. In this specification a metal-free phthalocyanine will be designated, $H_2Pc$, and a metallised phthalocyanine, such as copper(II) phthalocyanine, will be designated, Cu(II)Pc.

Each R is preferably optionally substituted mono- or bi-cyclic aryl or heteroaryl, and is more preferably selected from phenyl, naphthyl, thienyl, furyl, pyrryl, thiazolyl, isothiazolyl, quinolyl, indolyl, pyridyl, benzoimidazolyl and benzothiazolyl, which may carry up to 3, but preferably not more than 2, substituents. Where R is phenyl the substituents may be situated in the ortho, meta and/or para positions with respect to the X linking atom. Preferred substituents are selected from $C_{1-20}$-alkyl, especially $C_{1-4}$alkyl; $C_{1-20}$-alkoxy, especially $C_{1-4}$-alkoxy; S-$C_{1-20}$-alkyl, especially S-$C_{1-4}$alkyl; aryl, especially phenyl; S-aryl, especially S-phenyl; halogen, especially chloro or bromo; nitro; cyano; tertiary amino, such as di-N-alkyl-, N-alkyl-N-aryl- and di-N-aryl-amino, especially di-($C_{1-4}$-alkyl)amino, N-$C_{1-4}$-alkyl-N-phenylamino and di-phenylamino; —COOH and acyl and acylamino, such as $COT^1$, $CONT^1T^2$, $SO_2T^1$ and $SO_2NT^1T^2$ in which $T^1$ and $T^2$ are each independently selected from H, alkyl, especially $C_{1-4}$alkyl; aryl, especially phenyl and aralkyl, especially benzyl.

It is preferred that the average value of m is from 6 to 16 and more especially from 8 to 16.

Each $R^1$ is preferably phen-1,2-ylene or naphth-3,4-ylene or phen-1,2-ylene or naphth-3,4-ylene substituted by a group selected from any of the substituents listed above for R. It is preferred that $R^1$ is unsubstituted or is substituted by halogen or $C_{1-10}$-alkyl, and more especially $C_{1-4}$-alkyl. It is also preferred that the average value of n is from 0 to 5.

It is preferred that X is S, also that Y is S or NT and also that Z is S or NT. It is especially preferred that Y is S and Z is NT. It is preferred that T is H, $C_{1-4}$-alkyl, especially methyl, or phenyl.

It is preferred that 2n+m is from 13 to 16, and more preferably 14, 15 or 16. The remaining peripheral carbon atoms on the phthalocyanine nucleus preferably carry H, halogen, especially chlorine or bromine, OH, alkoxy, preferably $C_{1-4}$-alkoxy and more especially isoamyloxy, or a combination of these groups.

The sulphonate groups, —$SO_3M$, are preferably located on the peripheral aromatic groups, R and $R^1$. Depending on the nature of the group M, aqueous solubility generally increases with the number of sulphonate groups and this can be modified by increasing or decreasing the extent of sulphonation to suit any specific application. For reasonable water-solubility it is preferred that there are, on average, at least 3, and more preferably at least 5 sulphonate groups per molecule although the compound may contain 10 or more sulphonate groups. Where relatively high solubility is required it is desirable that the aromatic groups R and $R^1$ have, in total, sufficient free and unhindered carbon atoms to accommodate at least 5, more preferably at least 8, and especially from 10 to 15, sulphonate groups.

For any particular number of sulphonate groups, solubility in highly polar media, such as water and aqueous-based systems is enhanced if M is an alkali metal, unsubstituted ammonium or ammonium carrying hydrophilic substituents. Thus, in a preferred compound of Formula I for use in aqueous-based systems, M is an alkali metal, especially, sodium, potassium or lithium, or unsubstituted ammonium. The term aqueous-based systems includes media comprising a substantial proportion, preferably at least 50% by weight, of water and optionally other water-miscible liquids such as simple glycols, e.g. ethylene glycol, or lower aliphatic alcohols, e.g. methanol.

It has, however, been found that solubility in less polar media, comprising a minor proportion, preferably less than 25%, water or comprising only polar, organic liquids, such as glycols, e.g. ethylene glycol, diethylene glycol and poly-(alkylene glycols) and alcohols. e.g. methanol, ethanol, propanol and butanol is enhanced when M is substituted ammonium, carrying at least one fatty aliphatic group, especially $C_{1-20}$-alkyl or $C_{1-20}$alkenyl, or is arylguanidinium, especially diarylguanidinium, such as diphenylguanidinium and di-2-tolylguanidinium.

The substituted ammonium group is preferably of the formula $NQ_4$ in which at least one Q is a fatty aliphatic group or two Qs, together with the N atom, form an heteroalicyclic or heteroaromatic group, such as pyridino, piperidino or morpholino. It is further preferred that the other two or three Qs, each independently represents H, $C_{1-4}$-alkyl, phenyl or benzyl. It is especially preferred that at least one, and more preferably three, of the groups represented by Q is H.

The fatty aliphatic group represented by Q preferably contains from 6 to 10, more preferably from 7 to 10, and especially preferably 8 or 9, carbon atoms. Preferred fatty aliphatic groups are alkyl and alkenyl and more especially such groups in which the carbon chain contains at least one branch and more especially from 2 to 4 branches. Preferred alkyl groups, represented by Q, containing 8 or 9 carbon atoms, are 3,5,5-trimethylhexyl, 1,1,3,3-tetramethylbutyl and 2-ethylhexyl. Examples of other aliphatic chains are 1-ethyl-3-methylpentyl, 1,5-dimethylhexyl, 1-methylheptyl, octyl, nonyl, 1,4-dimethylheptyl, 1,2,2-trimethylpropyl, 2-ethylbutyl, 1-propylbutyl, 1,2-dimethylbutyl, 2-methylpentyl, 1-ethylpentyl, 1,4-dimethylpentyl, hexyl, 1-methylhexyl, 3-methylhexyl, heptyl, 1,3,3-trimethylbutyl, 1-methylnonyl, decyl, dodecyl, tridecyl, pentadecyl, hexadecyl and octadecyl. The substituted ammonium preferably carries one fatty alkyl group as described above the remaining groups being preferably H, $C_{1-4}$-alkyl, especially, methyl, or aralkyl, especially, benzyl. It is, however, preferred that at least one, and more preferably all three, of the remaining groups represented by Q is H. Suitable ammonium groups are 2-ethylhexylammonium, 1,1,3,3-tetramethylbutylammonium, 3,5,5-trimethylhexylammonium, lauryltrimethylammonium, laurylbenzyldimethylammonium, octadecyltrimethylammonium and more especially cetylpyridinium and cetyltrimethylammonium.

The arylguanidinium group is preferably diarylguanidinium, of the formula:

$$T^3\text{—NH—C(NHT}^4\text{)—NH—T}^3$$

in which each $T^3$ independently represents an optionally substituted phenyl group, especially phenyl or $C_{1-4}$-alkylphenyl and $T^4$is H or $C_{1-4}$-alkyl. It is preferred that the two groups $T^3$ are identical and examples are phenyl and 2-tolyl.

In an especially preferred compound of Formula I,

Pc is Cu(II)Pc;

R is phenyl, $C_{1-4}$-alkylphenyl or $C_{1-4}$-alkoxyphenyl;

X is S; m is 8 to 16;

$R^1$ is phen-1,2-ylene, naphth-1,2-ylene or naphth-2,3-ylene;

Y is S; n is 0 to 4;

Z is NT, S or O T is H or $C_{1-4}$-alkyl

M is selected from H, alkali metal (especially Na), $NH_4$, $NH_3Q^1$ and diarylguanidinium; and $Q^1$ is as hereinbefore defined, especially $C_{8-9}$-alkyl having from 1 to 4 branches.

The compounds of Formulae I and II may be prepared by direct sulphonation of a compound of Formula I in which p=0. The conditions for sulphonation depend on the number of sulphonate groups which it is desired to introduce into the molecule. However, it is possible to introduce up to 15 or 16 sulphonate groups by the use of 100% sulphuric acid at ambient temperatures. Compounds of Formula I in which p=0 and their preparation are described in EP 155780A.

The present compounds have a significant absorption band in the near infra-red region of the electromagnetic spectrum, i.e. from 700 to 1500 nm. The region from 750 to 1100 nm is of particular importance for optical character recognition (OCR) and for energy conversion, e.g. from laser radiation to heat. Many OCR systems use solid state semi-conductor lasers, which generally emit at 780–830 nm, as the radiation source and photodiode detectors based on silicon which have peak sensitivity around 900 rim. The powerful YAG laser, which is widely-used for energy conversion, emits at 1060 nm. The compounds of Formula 1 in which n=0 generally have fairly narrow absorption bands in the 750–850 nm region while the compounds of Formula I in which n>0 have a broader absorption band in the 800–950 nm region.

The compounds of Formula I in which n=0, m=15–16 and R—X— is arylthio, especially 4-($C_{1-4}$-alkyl)phenylthio, exhibit an intense narrow absorption curve with very high extinction coefficients (typically about $10^5$)) centred around 750–800 nm and are compatible with the solid state lasers. There is little absorption in the visible region (400–700 nm) so that the compounds are almost colourless, a very desirable property in applications such as security printing.

Compounds of Formula I, in which n=4 and m=7 or 8, particularly those in which Y=S, Z=NH and $R^1$ is phen-1,2-ylene and R is arylthio exhibit a much broader absorption band centred at 800–900 nm and lower extinction coefficients (typically about $3–5\times10^4$). Such compounds are compatible with both semi-conductor lasers and silicon detectors and, to a lesser extent, with YAG lasers.

Sulphonation normally has little or no effect on the absorption properties of organic molecules. Therefore, it is surprising that sulphonation of the compounds described in EP 155780A should produce significant changes in their absorption spectra.

An unsulphonated analogue of Formula I (RX=4-methylphenylthio, m=15 or 16, Pc=Cu(II)Pc, n=p=0) has a narrow band spectrum with a shoulder at ca 685 nm. The sulphonated compound of Formula I (p=12.5, m=Na) has a broader band spectrum at the same position without the pronounced shoulder at 685 nm.

An unsulphonated analogue of Formula I (RX=4-methylphenylthio, m=8, Y=S, $R^1$=1,2-phenylene, Z=NH, n=4, p=0) has an absorption maximum at 890 nm in $CH_3Cl$ with a half-band width of 270 nm. The sulphonated compound of Formula I (p=10, m=Na) has an absorption maximum at 833 nm in water and a half-band width of 360 nm. Thus, the sulphonated compound has an unexpectedly broader absorption band, making it more compatible with semi-conductor lasers (sharp emission at 780–830 nm) and silicon detectors than the unsulphonated analogue.

Various applications of the present compounds, especially for printing inks, require products which are soluble in solvents of differing polarities. The major requirements are for water-soluble products (water and water-alcohol or water-glycol mixtures), alcohol (typically methanol, ethanol and propanol) and glycol (typically ethylene glycol and diethylene glycol) soluble products and ketone (typically MEK) soluble products. The sulphonated products and their alkali metal and ammonium salts, especially those containing from 8 to 16 sulphonate groups, are highly soluble in water, water/glycol and water/alcohol mixtures. The fatty ammonium and diarylguanidinium salts of these sulphonated products exhibit good solubility in polar organic media such as lower alcohols, e.g. ethanol, and glycols, e.g diethylene glycol.

For inks based on solvents of lower polarity, such as ketones, hydrocarbons and chlorinated hydrocarbons, such as MEK, toluene and dichloromethane, unsulphonated versions of the compounds of Formula I, i.e. those in which p=0, are especially suitable and such compounds are described in EP 155,780A and in our co-pending UK Application No. 8705576.

Mixtures of compounds within the three classes can be employed to produce intermediate effects in terms of absorption band-widths and solubilities.

The high extinctions coefficients, particularly of the compounds in which n=0, allow the production of prints with very high print contrast ratios (PCR), generally >60%, and in some cases >75%, for efficient and accurate reading with OCR equipment.

Other applications include (i) ink drying where the improved absorption of radiant energy, e.g from infra red lamps, and its conversion into heat permits faster drying rates in printing applications, (ii) flash-fusion of toners in electro-reprography and (iii) as charge control agents in electro-reprography.

The compounds of Formula I exhibit good durability, including high fastness to heat and light. The durability to light, in particular, in considerably greater than for other known classes of infra-red absorbers such as cyanines, triphenylmethanes, complex nickel salts of dithiols, oxathiols and arylimminium and di-imminium compounds.

The present invention is further illustrated by the following examples in which all parts and percentages are by weight unless otherwise indicated.

EXAMPLE 1

(a) 2-Aminothiophenol (58.4 g, 0.42 mol), 4-methylphenylthiol (99.2 g, 0.08 mol), and potassium hydroxide (105.6 g, 1.6 mol), were stirred in DMF (800 ml) at 120°–130° C., for 40 minutes. To the mixture was added, portionwise over 30 minutes, commercial bromotetradecachloro-CuPc (VYNAMON Green 2GFW, 113.9 g, 0.10 mol) and the mixture stirred at 125° C. for 2 hours. After cooling to 80° C. ethanol (1600 ml) was added to the stirred reaction mass in order to precipitate the product. The precipitate was filtered off and washed with ethanol and water. The paste was suspended in water, stirred, filtered, and washed with water and ethanol. The wet solid was dried in a vacuum oven at 40° C. and 20 mbar.

| | |
|---|---|
| Yield: | 86 g (42% theory) |
| $WL_{max}$: | 890 nm (in $CH_3Cl$) |
| $EC_{max}$: | 46,000 (in MEK) |
| Solubility: | 10% (in MEK, 25° C.) |

$WL_{max}$ is the wavelength of the absorption maximum; and $EC_{max}$ is the extinction coefficient at the absorption maximum.

The product comprised a mixture of substituted-thio-CuPc with the average formula, hepta(4-methylphenylthio)-tetra( 1-amino-2-thio-phen-1,2-ylene)-CuPc (OTCPC).

(b) Fuming sulphuric acid (sp.gr. 1.92, 520 ml) was added to water (20 ml) with stirring. To this was added OTCPC (100 g), over 20 minutes with stirring, while the temperature was held at 10°–20° C. with an ice-bath. The mixture was stirred for 2½ hours at room temperature, then poured onto ice (1.51 ), and the solid separated by filtration. The solid was dissolved in ethanol (11), and the solution neutralised with a 32% aqueous solution of sodium hydroxide. After cooling, the inorganic salts were removed by filtration, and the filtrate evaporated to dryness. The crude product was purified by dialysis through Visking tubing. Analysis of the product showed that each molecule carried, on average, 10 sulphonate groups.

| | |
|---|---|
| Yield: | 135 g |
| $WL_{max}$: | 833 nm (in $H_2O$) |
| $EC_{max}$: | 30,000 (in $H_2O$, MW cs 3057) |
| Solubility: | >10% (in $H_2O$, 25° C.)) |

EXAMPLE 2

The procedure of Example 1(b) was repeated except that the OTCPC was replaced by an equivalent quantity of pentadeca(4-methylphenylthio)-CuPc. The product contained on average, 12.5 sulphonate groups per molecule and had the following properties:

| | |
|---|---|
| $WL_{max}$: | 765 nm (in $H_2O$) |
| $EC_{max}$: | 51,000 (in $H_2O$) |
| Solubility: | >10% (in $H_2O$, 25° C.) |

EXAMPLE 3

The procedure of Example 1(b) was repeated that the OTCPC was replaced by an equivalent quantity of penta(2-aminophenylthio)-penta-(1-amino-2-thiophen- 1,2-ylene)-CuPc. The product contained, on average, 9.5 sulphonate groups per molecule and had the following properties:

| | |
|---|---|
| $WL_{max}$: | 900 nm (broad peak, in $H_2O$) |

EXAMPLE 4

The product from Example 1b (15 g) was dissolved in water (150 ml) (Solution A).

1,1,3,3-Tetramethyl butylamine (13.6 g) was added to water (136 ml) and dissolved by the addition, with agitation, of 35% HCl, until the resultant solution was acid to Congo Red test papers (Solution B).

Solution B was added to Solution A, with good agitation, dropwise at room temperature, whilst maintaining the pH at about 8 by the simultaneous dropwise addition of 32% NaOH solution. After the addition, stirring was continued until precipitation of the product was complete. The product was recovered by filtration, and dried at 50° C.

| | |
|---|---|
| Yield: | 19 g |
| Solubility: | >10% (in ethanol, 25° C.)) |
| Solubility: | >10% (in ethylene glycol, 25° C.) |

EXAMPLE 5

The product from Example 4, after optional purification to normal ink-jet standards by known techniques e.g. dissolution in ethanol and filtration to remove finely divided solid, was made up into an ink by addition of known ink additives. The ink, after application to e.g. paper by known techniques gave prints which had a reflectance spectrum with $WL_{max}$ at 830 nm and a broad absorption which gave a good print contrast ratio over the whole spectral range from 750–1000 nm.

EXAMPLE 6

The product from Example 2 (2.5 g) was stirred in solution at pH 10 and 1,3-di-2-tolylguanidine (2.5 g) was added. The mixture was stirred at room temperature and the pH adjusted to 5 with orthophosphoric acid. After stirring for 2 hours at room temperature at pH 5 the solid was separated by filtration and washed with a small volume of water. The wet solid was dried in the electric over at 80° C.

| | |
|---|---|
| Yield: | 3.0 g |
| $WL_{max}$: | 770 nm (in ethanol) |
| $EC_{max}$: | 91,000 (in ethanol) |
| Solubility: | >10% (in ethanol, 25° C.) |

EXAMPLE 7

The product from Example 1(b) (4.0 g) was dissolved in water (45 ml) (Solution A). 3,5,5-trimethylhexylamine (2.21 g) was added to Solution A and after stirring for five minutes the pH was adjusted to 4.5 with 88% $H_3PO_4$. The product was recovered by filtration and dried at 50° C. to give 4.5 g of product. The product has good solubility in ethanol and diethylene glycol.

EXAMPLE 8

The product from Example 1(b) (15.2 g) was dissolved in water (150 ml) (Solution B).

2-Ethylhexylamine (6.6 g) was added to water (66 ml) and dissolved by the addition, with agitation, of conc. hydrochloric acid, until the resultant solution was acid to Congo Red test papers. The solution was diluted to 100 ml by the addition of water (Solution C).

Solution C was added dropwise over 30 minutes to Solution A, under agitation, at ambient temperature, keeping the pH at 6–8 by the simultaneous addition of 32% NaOH solution. After stirring for a further one hour, the precipitated product was filtered off, washed with a little water and dried at 50° C. to give 18.3 g of product. The product had good solubility in ethanol at 25° C.

EXAMPLE 9

A 6% ink was made up by mixing 3 parts of the product of Example 4 and 1 part of the product of Example 6 in 62.6 parts of methanol. The ink, after application to paper by gravure, printin, gave a print with a reflectance spectrum having broad absorption over the 700–1000 nm range and a good print contrast ratio over the same range.

EXAMPLE 10

The product of Example 1(b) (3.0 g) was dissolved in water (30 ml) at ambient temperature (Solution A). Cetylpyridinium chloride (3.6 g) was added portionwise with stirring to Solution A. The precipitated solid was filtered, washed with water and dried at 50° C. This product has good solubility in ethanol at 25° C.

EXAMPLE 11

The procedure of Example 10 was repeated except that the cetylpyridinium chloride was replaced by an equivalent quantity of cetyltrimethylammonium chloride. The resultant product has good solubility in ethanol at 25° C.

What is claimed is:

1. A phthalocyanine compound of the formula:

$$(R—X—)_m Pc(—Y—R^1—Z—)_n(—SO_3M)_p \quad \text{I}$$

wherein

Pc is a phthalocyanine nucleus (Pc);

each R independently is a monovalent aromatic radical linked to a peripheral carbon atom of the Pc nucleus through X selected from phenyl, naphthyl, thienyl, furyl, pyrryl, thiazolyl, isothiazolyl, quinolyl, indolyl, pyridyl, benzoimidazolyl and benzothiazolyl each of which is unsubstituted or substituted by up to 3 substituents selected from $C_{1-20}$-alkyl, $C_{1-20}$-alkoxy, S-$C_{1-20}$-alkyl, halogen, aryl, S-aryl, nitro, cyano, di-N-alkylamino, N-alkyl-N-arylamino, di-N-arylamino, COOH, $COT^1$, $CONT^1T^2$, $SO_2T^1$ and $SO_2NT^1T^2$ in which $T^1$ and $T^2$ are selected from H, alkyl, aryl and aralkyl;

X selected from S, Se and Te;

m is 4 to 16;

each $R^1$ independently is a divalent aromatic radical linked to two adjacent peripheral carbon atoms of the Pc nucleus through Y and Z selected from phenylene, naphthylene, substituted phenylene and substituted naphthylene in which the substituents are selected from $C_{1-20}$-alkyl, $C_{1-20}$-alkoxy, S-$C_{1-20}$-alkyl, halogen, aryl, S-aryl, nitro, cyano, di-N-alkylamino, N-alkyl-N-arylamino, di-N-arylamino, COOH, $COT^1$, $CONT^1T^2$, $SO_2T^1$ and $SO_2NT^1T^2$ in which $T^1$ and $T^2$ are selected from H, alkyl, aryl and aralkyl;

Y is selected from S, NT, Se and Te;

Z is selected from S, Se, Te, NT and O;

T is selected from H, alkyl and aryl;

n is 0 to [7] *6*;

*2n+m is 13 to 16;*

M is selected from H; a metal; ammonium; substituted ammonium of the formula $NQ_4$ in which at least one Q is a $C_{6-20}$-fatty aliphatic group or two Qs together with the nitrogen atom, form a heteroalicyclic or heteroaromatic group selected from pyridino, piperidino and morpholino and the other two or three Qs are each independently selected from H, $C_{1-4}$-alkyl, phenyl and benzyl; and diarylguanidinium of the formula:

$T^3$—NH—C($NHT^4$)—NH—$T^3$ in which each $T^3$ is phenyl or $C_{1-4}$-alkylphenyl and $T^4$ is H or $C_{1-4}$-alkyl;

and p is from 1 to 16.

2. A compound according to claim 1 in which Pc is Cu(II)Pc.

3. A compound according to claim 1 wherein Y is S, Se or Te.

4. A compound according to claim 1 wherein Q is selected from 3,5,5-trimethylhexyl, 2-ethylhexyl, 1,1,3,3-tetramethylbutyl, 1,2,2-trimethylpropyl, 2-ethylbutyl, 1-propylbutyl, 1,2-dimethylbutyl, 2-methylpentyl, 1-ethylpentyl, 1,4-dimethylpentyl, 1-ethyl-3-methylpentyl, hexyl, 1-methylhexyl, 3-methylhexyl, 1,3,3-trimethylbutyl, 1,5-dimethyl-hexyl, heptyl, 1-methylheptyl, 1,4-dimethylheptyl, octyl, nonyl, 1-methylnonyl, decyl, dodecyl, tridecyl, pentadecyl, hexadecyl and octadecyl.

5. A compound according to claim 1 wherein one Q is $C_{8-9}$-alkyl and the other three Qs are H.

6. A compound according to claim 1 wherein

Pc is Cu(II)Pc;

R is phenyl, $C_{1-4}$-alkylphenyl or $C_{1-4}$-alkoxyphenyl;

X is S;

m is 8 to 16;

$R^1$ is phen-1,2-ylene, naphth-1,2-ylene or naphth-2,3-ylene;

Y is S;

n is 0 to 4;

Z is NT, S or O T is H or $C_{1-4}$-alkyl;

M is selected from H, alkali metal, $NH_4$, $NH_3Q$ and diarylguanidinium; and

Q is a $C_{8-9}$-alkyl.

* * * * *